United States Patent [19]

Imagire et al.

[11] Patent Number: 4,629,606
[45] Date of Patent: Dec. 16, 1986

[54] RECOVERY OF TUNGSTEN COMPOUNDS

[75] Inventors: Yoshiyuki Imagire, Musashino; Teruhiko Hirabayashi, Tokyo; Nobuo Nonaka, Tokorozawa; Toshifumi Kitagawa, Kawaguchi; Yasukazu Murakami, Matsudo; Iwao Abe; Shinzo Uda, both of Ohtake; Osamu Ohshima, Yamaguchi; Etsuo Takemoto, Ohnomachi, all of Japan

[73] Assignee: Daicel Chemical Industries, Ltd., Osaka, Japan

[21] Appl. No.: 755,402

[22] Filed: Jul. 16, 1985

[30] Foreign Application Priority Data

Jul. 18, 1984 [JP] Japan .................... 59-149079

[51] Int. Cl.⁴ .................................... C01G 41/00
[52] U.S. Cl. ............................. 423/53; 423/59; 423/61; 502/23; 502/24
[58] Field of Search ............... 423/53, 59; 502/23, 502/24

[56] References Cited

U.S. PATENT DOCUMENTS 3,453,068  7/1969  Tave ............................. 423/59
4,197,161  4/1980  Friedrich et al. .............. 201/31

Primary Examiner—H. T. Carter
Attorney, Agent, or Firm—Flynn, Thiel, Boutell & Tanis

[57] ABSTRACT

The present invention provides a process for recovering a tungsten compound from a waste liquor containing a high-boiling organic compound and the tungsten compound, which process comprises the steps of spray-burning said waste liquor at an air ratio of 1.05 or higher under conditions of a temperature and a residence time which lie within the region of a pentagon defined by points A, B, C, D, and E in FIG. 1; quenching the combustion product by immediately bringing it into direct contact with water; and recovering the tungsten compound.

6 Claims, 3 Drawing Figures

RECOVERY OF TUNGSTEN COMPOUNDS

BACKGROUND OF THE INVENTION

1. Field of the Invention

The present invention relates to a process for recovering a tungsten compound by burning a waste liquor containing a soluble tungsten compound, such as a distillation residue.

Heretofore, tungstic acid, its alkali salt or compounds containing tungsten as a component, such as heteropoly acid, have been used as catalysts for epoxidizing or hydroxylating a water-soluble, double bond-containing compound such as allyl alcohol. Especially, tungsten compounds are excellent as catalysts for epoxidation reactions. Because they are expensive, these catalysts are an important factor for the economy of the production process, so that a great number of processes for recovering tungsten-containing catalysts have been proposed.

The present invention provides an advantageous process for recovering a catalyst component in a effective form by burning a waste liquor as mentioned above to gasify organic components.

2. Description of the Prior Art

Although processes for recovering a tungsten compound include a precipitation process comprising the addition of calcium chloride, an ion exchange process with the use of an ion exchange resin, and a precipitation process with the use of a strong alkali or a strong acid, these processes have a drawback that waste water highly loaded with salts is produced, so that the quantitative recovery of catalysts is not possible.

Because tungstic acid or its alkali salt is relatively unstable to heat and partially forms tungsten oxide at high temperatures, it undergoes decreases in water solubility and catalytic activity. Therefore, a process wherein burning is performed in a fluidized bed at a relatively low temperature below the melting point (Japanese Patent Publications No. 43136/1983 and No. 43142/1983) is practically the only process known as a process for treating a waste liquor containing a compound of this kind by burning. However, because of the characteristics of the burning process, it is difficult to gasify the organic compounds completely in a single-stage fluidized bed, and therefore carbonaceous substances remain almost inevitably. In order to remove the carbonaceous substances completely, it is necessary to prolong the residence time or to use a multi-stage bed, but in any case, a larger apparatus and additional fuel are required, which is not economical. When the burning temperature is increased in the case of a low-melting compound (for example, $Na_2WO_4$, m.p. 698° C.), not only is its fluidization difficult, but also the recovery of the tungsten oxide formed by decomposition due to prolonged heating is extremely difficult, because tungsten oxide is easily sublimable to form a fume. On the other hand, it has been believed that spray burning is impossible because a considerable portion of a tungsten compound is insolubilized in water under usual conditions for a waste water, i.e., a temperature of 800° to 1,000° C. and a residence time of about 1 second, and this causes a marked decrease in the catalyst activity.

SUMMARY OF THE INVENTION

It is an object of the present invention to meet the following requisites encountered in recovering a tungsten compound soluble in water and in an organic compound, whose recovery has heretofore been thought difficult, as mentioned above, from a waste liquor containing the compound: that is, the deterioration of the recovered tungsten compound is minimized so that it can serve as an effective catalyst component; the aqueous solution of the compound contains as little as possible of impurities, such as COD and carbonaceous substances, which show an inhibitory action in the subsequent uses, that is, the solution has a high decomposition rate of the organic components; the operation and apparatus are relatively simple; and fuel consumption is low.

As a result of extensive studies to solve the above problems, the inventors of the present invention have found that the problems can be solved by suitably selecting the residence time and the temperature, even when the selected temperature is higher than the burning temperature (800°0 to 1000° C.) for a waste liquor containing usual organic compounds, the use of which has heretofore been thought to be impossible from the viewpoint of the heat stability of a tungsten compound, and have accomplished the present invention.

DETAILED DESCRIPTION OF PREFERRED EMBODIMENTS

Figure 1:
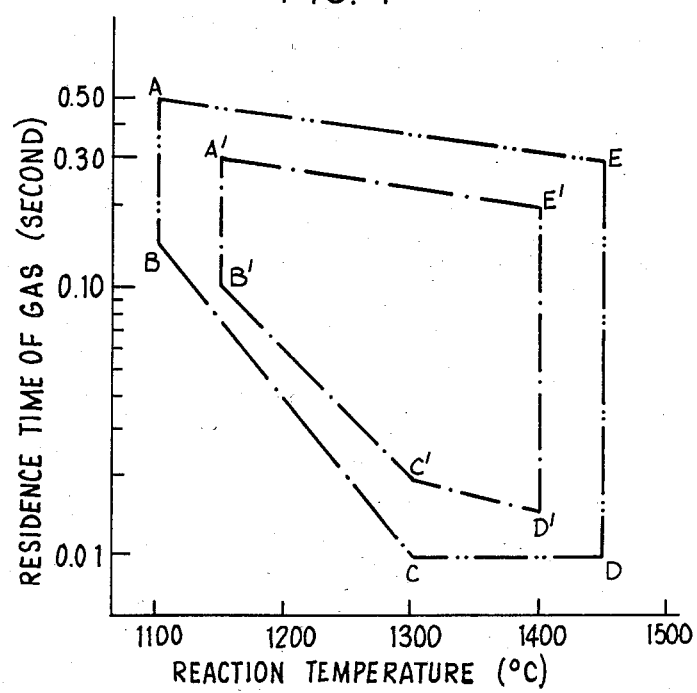
FIG. 1 is a graph showing the relationship between the reaction temperature and the residence time of gas in the recovery process of the present invention.

The present invention provides a process for recovering a tungsten compound, comprising the steps of spray-burning a waste liquor containing a high-boiling organic compound and the tungsten compound at an air ratio of 1.05 or higher under conditions of a temperature and a residence time within the pentagonal region defined by points A, B, C, D, and E in FIG. 1; quenching the combustion product by immediately bringing it into direct contact with water; and recovering the tungsten compound.

The tungsten compounds mentioned in the present invention include those soluble in water or a hydroxyl compound, such as sodium or potassium salts of tungstic acid or tungsten-containing heteropoly acid.

According to the invention, the air ratio is defined as the volume ratio of the amount of air used actually to the ideal amount of air which is required to burn up all the waste liquor. When the air ratio is larger, the air used may serve to cool the waste liquor which is being burned. A suitable air ratio depends on the amount of heat generated and the combustion temperature.

In FIG. 1, the vertical axis shows the residence time of the gas in seconds, on a logarithmic scale, and the horizontal axis shows the reaction temperature in degrees centigrade, on an arithmatic scale. A, B, C, D and E are each fixed as follows:

A: 1100° C. and 0.5 sec.
B: 1100° C. and 0.15 sec.
C: 1300° C. and 0.01 sec.
D: 1450° C. and 0.01 sec.
E: 1450° C. and 0.3 sec.,
preferably
A: 1150° C. and 0.3 sec.
B: 1150° C. and 0.1 sec.
C: 1300° C. and 0.02 sec.
D: 1400° C. and 0.015 sec.
E: 1400° C. and 0.2 sec.

The waste liquors which can be handled in the present invention generally contain, in most cases, high-molecular weight organic compounds (high-boiling organic compounds). Their calorific values are approximately 8,000 kcal/kg though they may vary depending on the kinds, amounts, etc., of the organic compounds. According to our experience, self-combustion combustion in spray burning of a waste liquor is possible if its theoretical flame temperature is higher than about 1200° to 1300° C. However, the combustion efficiency is sometimes lower because the high-molecular compounds are usually so viscous that they are difficult to spray in finely divided droplets. In this case, it is necessary to raise the temperature of the waste liquor fed to the burner or to dilute it with a solvent such as water. Because the calorific value of the waste liquor as a whole is lowered when it is diluted with water, care must be taken to maintain the calorific value at about 3000 kcal/kg or higher when self-combustion is desirable.

The burning condition in the present invention includes a high temperature and a short residence time which lie within the pentagonal region defined by points A, B, C, D, and E, or preferably within the pentagonal region defined by points A', B', C', D', and E', and therefore it is necessary to use an apparatus which allows so-called high intensity combustion. Further, it is an important requirement to quench the combustion product by effective and direct contact with water. Suitable apparatuses which can be used include ones disclosed in, for example, Japanese Patent Laid-Open No. 69229/1980 and, more specifically, ones shown in FIGS. 2 and 3 thereof. While a combustion product is quenched in these apparatuses by directly blowing it into water while in contact with a wetted wall, the apparatus in this invention is not necessarily limited to a submerged combustion type but any apparatus that can cool a combustion product by direct contact with water, for example, a Venturi scrubber or a spray tower, may be used freely. It is preferable that the combustion burner has the quickest and shortest possible flame, and it is desirable that the combustion is brought to completion before contact with water.

Figure 2:
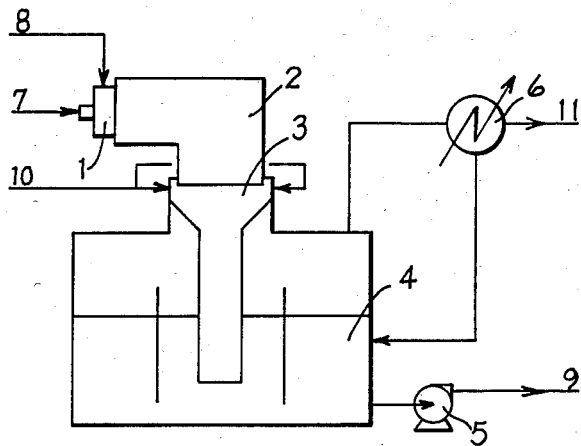
Figure 3:
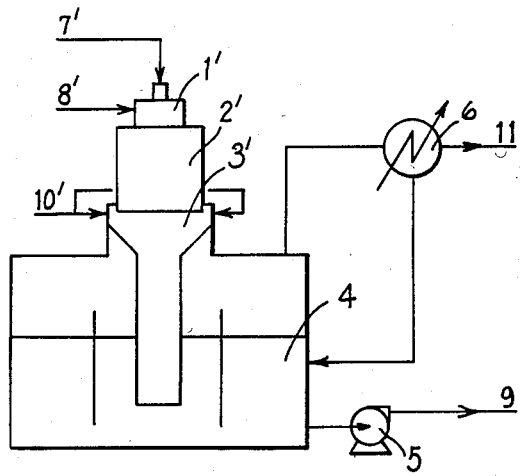

FIG. 2 is a schematic view of an example of an apparatus used in the process of the present invention, and FIG. 3 is a schematic view of an example of a modification of the shape of the reaction furnace of the apparatus. In these figures, 1, 1' are each a burner, 2, 2' each a reaction furnace, 3,3' each a cooling section, 4 a catalyst recovery section, 5 a pump for transferring 7' each a distillation residue, 8, 8' each air, 9 a recovered catalyst solution, 10, 10' each quench water, and 11 exhaust gas.

The term "residence time" as used herein refers to the residence time of a gas within a reaction furnace (2, 2' in Figures).

Examples of the waste liquors in the present invention include distillation residues obtained from reaction solutions containing a tungsten compound used as a catalyst. The recovery process of the present invention is applied particularly suitably to a process for recovering a catalyst from a distillation residue separated from a reaction solution obtained by epoxidizing or hydroxylating a double bond-containing compound with hydrogen peroxide by using a tungsten compound as a catalyst. Examples of the double bond-containing compounds include water-soluble olefin compounds such as allyl alcohol, crotyl alcohol, methallyl alcohol and cyclopentenol-3. The distillation residues can be obtained as usual by using, for example, a reboiler evaporator or a thin-film evaporator.

The burning temperature in this invention is 1100° to 1450° C., preferably 1150° to 1400° C. When this temperature is lower than 1100° C., it is difficult to maintain stable self-combustion and the residence time is prolonged, which adversely affects the tungsten compound. When this temperature exceeds 1450° C., the refractory of a burner tile becomes susceptible to the attack by a tungsten compound and, in addition, the tendency of a tungsten compound toward insolubilization increases, which is disadvantageous. Because a carbonaceous substance is deposited or COD is increased when the flame is in contact with water during burning, it is preferable that waste liquor is burnt completely before quenching. Therefore, a residence time of about 0.1 second (at 1300° C.) is particularly preferable from the viewpoint of the influence on complete combustion and a tungsten compound. In short, it is preferable that the waste liquor is burnt almost completely before the temperature is lowered to 1100° C., and the combustion product must be cooled as rapidly as possible by contact with water. It is one requirement for the present invention that the high-temperature produced gas is quenched by direct contact with water. It is the most efficient for this purpose that a submerged combustion apparatus is used, the combustion product is quenched by directly blowing it into water through a down-comer, and at the same time the tungsten compound is collected in the water. In some cases, however, an apparatus in which direct contact with water is performed, such as a Venturi scrubber, jet scrubber, or spray tower, can be used satisfactorily. The recovered aqueous solution of the tungsten compound can be directly used again as a catalyst solution.

According to the present invention, a water-soluble tungsten compound, whose effective recovery from a waste liquor containing organic compounds by a conventional spray drying/burning has been thought difficult, is burned at a high temperature within a short time, and of the combustion product is quenched with water. This makes it possible to decompose the organic compounds substantially completely and to recover the tungsten compound having a low impurity content and in a form sufficient for reuse without substantially any insolubilization. Further, the apparatus is compact, which is a feature of high intensity combustion, and self-combustion of a waste liquor is also possible, so that the present invention is one extremely excellent for industrial purposes.

The present invention will now be described in detail with reference to examples.

EXAMPLE 1

In the production of glycidol by epoxidizing allyl alcohol with hydrogen peroxide in the presence of sodium hydrogentungstate, a distillation residue consisting of about 10% of the catalyst and the balance of glycerin and polyglycerin was obtained. About 20% of water was added to this residue, and the mixture was heated to a temperature of 70° to 90° C. The obtained water-containing distillation residue was treated at a feed rate of about 35 to 40 kg/hr in an apparatus, as shown in FIG. 2, having a space volume of a reaction furnace of about 30 l. Namely, the above residue was sent from 7, mixed with air from 8 in a burner 1, and spray-burnt in a reaction furnace 2. The combustion product was immediately cooled with water sent from 10 in a cooling section 3, and recovered as an aqueous solution of sodium hydrogentungstate in a catalyst recovery section 4. The conditions for spray burning in this case included an air ratio of 1.2, a reaction temperature of 1290° C., and a residence time of reactant gas of 0.1 second.

50.0 g (0.862 mol) of allyl alcohol and 26.75 g (1.484 mol) of water were placed in a 100 ml-jacketted glass reactor fitted with a stirrer, dropping funnel, thermometer, and reflux condenser and heated to 40° C. To this mixture was added dropwise 24.83 g of a 60% hydrogen peroxide solution containing 5.4 g of the recovered sodium hydrogentungstate solution (content of sodium hydrogentungstate of 10%) under agitation over a period of 3 to 5 minutes. After 6 hours, the reaction yield of glycidol reached 85% of the theoretical value based on hydrogen peroxide.

On the other hand, the reaction yield of glycidol obtained when the reaction was performed by using fresh sodium hydrogentungstate instead of the recovered sodium hydrogentungstate was 85% of the theoretical value based on hydrogen peroxide.

COMPARATIVE EXAMPLE 1

The water-containing distillation residue was spray-burnt at an air ratio of 1.35 and a temperature of 1100° C. by using the same apparatus as in Example 1 except that the space volume of the reaction furnace was 176 l. Water spray was performed by using a separate nozzle and the apparatus was operated by setting the temperature of the furnace at 800° C. The residence time was about 1 second.

The recovered sodium hydrogentungstate was evaluated by the same apparatus and procedure as those used in Example 1. After 6 hours, the reaction yield of glycidol in this case reached only 53% of the theoretical value based on hydrogen peroxide.

The embodients of the invention in which an exclusive property or privilege is claimed are defined as follows:

1. A process for recovering a tungsten compound which is soluble in water, from a waste liquor containing the tungsten compound and high boiling organic compounds that can be burned at a temperature of from 1100° to 1450° C., which comprises the steps of: feeding air and said waste liquor to a nozzle associated with a reaction furnace, spraying a mixture of the air and said waste liquor from said nozzle into said reaction furnace so that the volume ratio of the amount of air fed into said reaction furnace to the ideal amount of air that is required to burn said waste liquor completely is at least 1.05/1, and effecting high intensity, self-combustion of said waste liquor in said reaction furnace at a high temperature and for a short residence time that fall within the closed pentagonal region defined by straight lines connecting the points A, B, C, D and E in the attached FIG. 1, and then, at the end of said residence time, immediately discharging the high temperature gaseous product of said combustion step from said furnace and quenching it by directly contacting it with water whereby the tungsten compound is dissolved in the water to form an aqueous solution, and thereby recovering the tungsten compound.

2. A process as claimed in claim 1 in which the temperature and residence time inside the reaction furnace fall within the closed pentagonal region defined by straight lines connecting the points A', B', C', D' and E' in the attached FIG. 1.

3. A process as claimed in claim 1 in which burning of said organic compounds is completed before the quenching step.

4. A process as claimed in claim 1 in which the waste liquor is obtained from a reaction for epoxidizing or hydroxylating a water-soluble, double bond-containing compound with hydrogen peroxide, in which reaction the tungsten compound acts as a catalyst.

5. A process as claimed in claim 1 in which said tungsten compound is selected from the group consisting of sodium salts of tungstic acid, potassium salts of tungstic acid and tungsten-containing heteropoly acid.

6. A process a claimed in claim 1 in which the high temperature gaseous product discharged from said furnace is flowed downwardly from said furnace directly into a bath of water.

* * * * *